United States Patent
Yoshitani

[19]

[11] Patent Number: 5,881,750
[45] Date of Patent: Mar. 16, 1999

[54] SUBSTRATE TREATING APPARATUS

[75] Inventor: Mitsuaki Yoshitani, Hikone, Japan

[73] Assignee: Dainippon Screen Mfg. Co., Ltd., Japan

[21] Appl. No.: 868,185

[22] Filed: Jun. 3, 1997

[30] Foreign Application Priority Data

Jun. 5, 1996 [JP] Japan .................................. 8-143065

[51] Int. Cl.⁶ .................................................. B08B 3/02
[52] U.S. Cl. ........................ 134/151; 118/316; 134/182; 134/902; 156/345 LS
[58] Field of Search ................................ 134/902, 64 R, 134/64 P, 122 R, 122 P, 131, 151, 153, 182; 156/345 L, 345 LS; 118/314, 316

[56] References Cited

U.S. PATENT DOCUMENTS

| | | | |
|---|---|---|---|
| 3,082,774 | 3/1963 | Benton et al. | 156/345 LS X |
| 3,776,800 | 12/1973 | Goffredo | 156/345 LS X |
| 3,791,345 | 2/1974 | McCutcheon | 118/316 X |
| 4,359,279 | 11/1982 | Popoff | 118/314 X |
| 5,524,654 | 6/1996 | Nakano | 134/902 X |

FOREIGN PATENT DOCUMENTS

| | | |
|---|---|---|
| 05277450 | 10/1993 | Japan . |
| 687338 | 12/1994 | Japan . |
| 07283185 | 10/1995 | Japan . |

Primary Examiner—Philip R. Coe
Attorney, Agent, or Firm—Ostrolenk, Faber, Gerb & Soffen, LLP

[57] ABSTRACT

This invention is directed to a substrate treating apparatus in which a treatment is performed upon a top surface and a bottom surface of a substrate to be carried on a substrate carrying plane inclined at a certain angle to a horizontal plane in a direction normal to a substrate carrying direction. The substrate treating apparatus includes a guide plate provided below a substrate carrying plane along which a bottom surface of the substrate is to be carried; and treating liquid supply means having a first treating liquid supply member for supplying a treating liquid to a clearance defined between the bottom surface of the substrate carrying plane and the guide plate.

19 Claims, 7 Drawing Sheets

SUBSTRATE TREATING APPARATUS

BACKGROUND OF THE INVENTION AND RELATED ART STATEMENT

The present invention relates to a substrate treating apparatus for use with glass substrates (base plates) for liquid crystals and photomasks, etc. on the surfaces of which thin films, such as of a photoresist coating solution, a photosensitive polyimide resin and dyestuffs for color filters, are to be formed. The apparatus supplies a given treating liquid to the principal planes of those substrates for desired treatment.

It has been known as conventional technology in treating apparatus for a substrate that has been subjected to certain treatment in a preceding step to be treated with a chemical and then carried to the next step after being cleaned with cleaning water. Such a substrate treating apparatus generally comprises an apparatus body including a chemical treatment station, a water cleaning station and a drying station arranged in series, and substrate carrying means provided to extend through the chemical treatment station, water cleaning station and drying station. A substrate is treated while being carried by the carrying means through the chemical treatment station, the water cleaning station and the drying station in the order named.

Specifically, certain chemical treatment is first performed on the substrate in the chemical treatment station by supplying various chemicals such as alkaline cleaning chemical, developer, etchant and remover to the top and bottom surfaces of a substrate. Then, after removing the chemical, a water cleaning process is performed on the substrate in the water cleaning station. Finally, a drying process is performed in the drying station by e.g., spraying air to the substrate.

When the substrate is carried from the chemical treatment station to the water cleaning station, there is the possibility that the substrate subjected to certain chemical treatment in the chemical treatment station is not completely free of the chemical on the top and bottom surfaces thereof. If such substrate is carried to the water cleaning station without incomplete removal of the chemical, chemical residuals are introduced to in the cleaning water in the water cleaning station, thereby contaminating the cleaning water which is circulated along a circulation passage for repeated use. As a result, usability of the cleaning water is reduced.

To avoid such a problem, an air knife is provided on a boundary between the chemical treatment station and the water cleaning station to allow gas in the form of an air curtain to be sprayed onto the top and bottom surfaces of the substrate. With this arrangement, chemical residuals on the top and bottom surfaces of the substrate are removed therefrom to such an extent that chemical residues do not dry on the surfaces of the substrate. Thus, intrusion of chemical into the water cleaning station is prevented.

In the water cleaning station, to perform a water cleaning process completely, such process is performed at two stages, i.e., in a first water cleaning section and a second water cleaning section.

When treating large sized substrates, it is often the case that a cleaning process in the first cleaning section and a cleaning process in the second cleaning section proceed simultaneously while the same substrate is being carried through the first and second water cleaning sections. That is, cleaning water (first cleaning water) is supplied to an upstream portion of the substrate carried in the first water cleaning section with respect to the substrate carrying direction (or simply referred to as a F-direction), while at the same time, another type of cleaning water (second cleaning water) is supplied to a downstream portion of the substrate carried in the second water cleaning section with respect to the substrate carrying direction (F-direction).

In such case, since the first cleaning water and the second cleaning water are supplied to the substrate at the same time, it is unavoidable that the first cleaning water mixes with the second cleaning water on the principal planes of the substrate. As a result, although desirable accurate replacement of the cleaning water is not executed on a boundary between the first water cleaning section and the second water cleaning section.

To solve the above drawback, space (intermediate zone) is provided at the boundary between the first water cleaning section and the second water cleaning section, and in this intermediate zone no process is performed on the substrate being carried by the carrying means. When the intermediate portion of the substrate passes through the intermediate zone, supplying of the first and second cleaning water is temporarily suspended. However, to make this arrangement, it is necessary to extend the water cleaning bath constituting the water cleaning station by the space corresponding to the intermediate zone, thus extending the whole length for the water cleaning bath. This leads to another problem, increasing cost of the facility.

To solve the drawback resulting from supplying the first and second cleaning water, simultaneously an air knife is provided at the boundary between the first and second water cleaning sections to spray gas toward the substrate being carried on the boundary. In this case, however, there is the possibility that the surface of the substrate will be dried partially by the gas ejected from the air knife. When the surface of the substrate is dried a certain part, stains are liable to be generated on the dried part, and such stains cannot be removed even by the water cleaning process. Accordingly, after the substrate is subjected to drying, it is highly likely that particles are generated from the stains, thus making it difficult to produce substrates free of contaminants.

To solve the above drawbacks, the applicant of this invention has proposed a substrate treating apparatus, see Japanese Patent Application No. HEI 8-88247 wherein cleaning water is ejected toward the top and bottom surfaces of a substrate from a water ejector comprising a pair of top and bottom ejectors arranged at one lateral end of the substrate in a direction normal to the substrate carrying direction (the F direction).

With this arrangement, streams of cleaning water ejected from the water ejector at a high fluid rate across the top and bottom surfaces of the substrate from the one lateral end to the opposite lateral end. This increases the effect of cleaning and smooth removal of the cleaning water from the surfaces of the substrate. Thus, this arrangement is effective in replacing cleaning water at the boundary between the first and second water cleaning sections without necessitating a larger sized water cleaning bath. This arrangement is also effective in suppressing generation of stains on the top and bottom surfaces of the substrate since there is no need for providing an air knife. However, in the apparatus of Japanese Patent Application No. 8-88247, water pressure for ejecting cleaning water is set at a relatively high level because the rear side ejecting means has an eject port oriented upward with a certain inclination angle to eject cleaning water toward the rear surface of the substrate. Due to the upward directing eject port of the rear side ejecting means, a phenomenon is likely to occur that cleaning water ejected toward the rear surface of the substrate drips down therefrom, due to the gravity, while running down the bottom surface, so the cleaning of the entire bottom surface is incomplete. To prevent such phenomenon, a high pressure cleaning water supply system must be provided.

SUMMARY OF THE INVENTION

Accordingly an object of the present invention is to provide a substrate treating apparatus which can solve the above problems which reside in the prior art.

Another object of the present invention is to provide a substrate treating apparatus capable of reliably replacing a treating liquid on the bottom surface of a substrate carried in an inclined posture, without raising treating liquid pressure, by supplying the treating liquid from a lateral side end of the substrate in the direction normal to the F-direction (substrate moving direction).

The above objects are fulfilled according to this invention which is directed to a substrate treating apparatus wherein treatment is performed on top and bottom surfaces of a substrate being carried in a substrate carrying plane inclined from a horizontal plane at a certain angle in a direction normal to a substrate carrying direction. The substrate treating apparatus includes a guide plate member provided below the substrate carrying plane along which a bottom surface of the substrate is to be carried; and treating liquid supply means comprising a first treating liquid supply member for supplying a treating liquid to a clearance defined between the bottom surface of the substrate carrying plane and the guide plate member.

With apparatus so constructed, the treating liquid is supplied from the first treating liquid supply member to a clearance defined between the guide plate and the substrate carrying plane. The treating liquid that is supplied fills in the clearance as it runs down through the clearance, assuring that treating liquid contacts the entire lower surface of the substrate to be carried along the substrate carrying plane. In particular, thanks to the guide plate disposed below the substrate carrying plane, gravity will not separate the treating liquid from the lower surface of the substrate halfway along the lower surface in a lateral direction of the apparatus (which is a direction normal to the substrate carrying direction). Thus, there is assurance that the treating liquid will run down along whole lower surface of the substrate, enhancing the efficiency of the treatment by the treating liquid on the lower surface of the substrate. As a result, a significant amount of the treating liquid which is conserved as compared to the much greater amount of treating fluid required for treating the lower surface of the substrate when using apparatus without the guide plate. In other words, with the guide plate thus provided the total amount of the treating liquid supplied onto the lower surface of the substrate can be much less than for the treatment of the lower surface without using the guide plate. Hence using the guide plate results in a reduced cost for treating the substrate.

These and other objects, features and advantages of the invention will become more apparent upon reading the detailed description of the preferred embodiment with reference to the appended drawings.

BRIEF DESCRIPTION OF THE DRAWINGS

FIG. 5A shows the downstream end (lead portion) of the substrate with respect to the substrate carrying direction (F-direction) entering a cleaning water supply area; FIG. 5B shows an intermediate portion of the substrate with respect to the substrate carrying direction (F-direction) at the cleaning water supply area; and FIG. 5C shows the substrate emerging the cleaning water supply area.

DETAILED DESCRIPTION OF THE PREFERRED EMBODIMENT OF THE INVENTION

Figure 1:
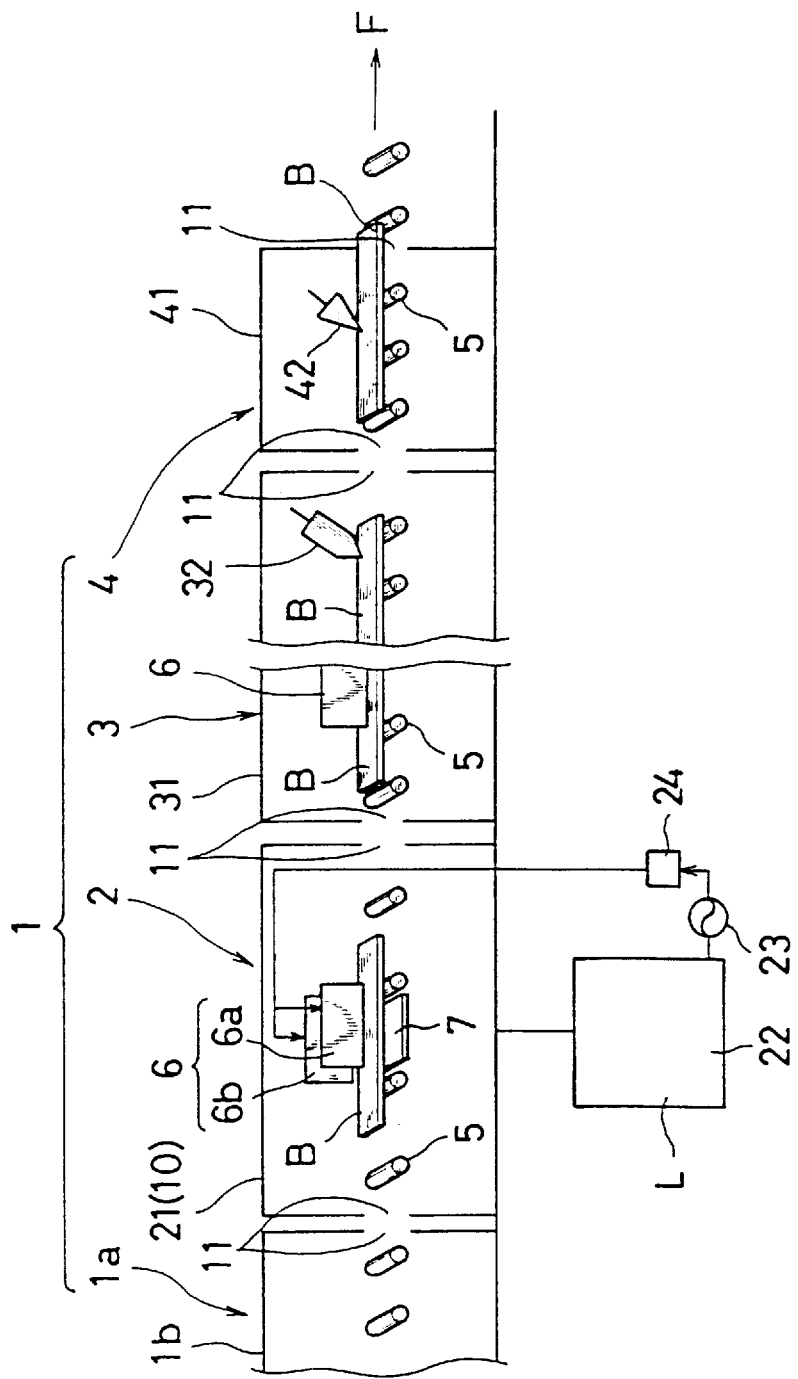
FIG. 1 is a schematic showing an embodiment of a substrate treating system comprising a group of substrate treating apparatuses, to which the present invention is applied.

Now referring to the explanatory view of FIG. 1 showing a substrate treating system having a group of substrate treating apparatuses, to one of which the present invention is applied. As shown in FIG. 1, a substrate treating system 1 is constructed by arranging in series (from the left to the right in FIG.1) a chemical treating station 1a where a certain chemical process is performed on a substrate B by supplying a given chemical to the principal planes of the substrate B, a first water cleaning station 2 where a first water cleaning process is performed on the substrate B treated with the chemical process in the chemical treating station 1a, a second water cleaning station 3 where a second water cleaning process is performed on the substrate B after being subjected to the first water cleaning process in the first water cleaning station 2, and a drying station 4 where the substrate B after being subject to the second water cleaning process in the second water cleaning station 3 is subjected to drying.

The chemical treating station 1a, first water cleaning station 2, second water cleaning station 3, and drying station 4 comprise, respectively a chemical treating bath 1b, first water cleaning bath 21, second water cleaning bath 31 and drying chamber 41 each in the form of a box. Each of the baths 1b, 21, 31, and drying chamber 41 are formed with upstream and downstream openings 11 at an upstream wall and a downstream wall thereof, respectively. These upstream and downstream openings 11 are opposed to each other horizontally. Substrate B is carried through opening 11 from the bath 1b to the baths 21, 31, and then to the drying chamber 41, sequentially.

In this embodiment, a roller conveyor is employed as carrying means to carry the substrate B through the baths 1b, 21, 31, and drying chamber 41. The roller conveyor is constructed by arranging a plurality of conveyor roller units 5 side by side with equal pitches in the carrying direction of the substrate B (to the right in FIG. 1 indicated with "F") with support shafts of the conveyor roller units 5 being oriented in a direction perpendicular to the carrying direction of the substrate B. By placing the substrate B on the roller conveyor under operation, the substrate B is carried in the carrying direction with synchronous rotation of the conveyor roller units 5 effected by driving of a drive unit (not shown).

The substrate B is transferred from the preceding step to the conveyor roller units 5 disposed upstream of the chemical treating bath 1b through upstream transfer means (not shown) such as a conveyor or a robot, and then introduced into the treating system 1 with the operation of the conveyor roller units 5. The substrate B is subjected to chemical treatment while it is carried by the conveyor roller units 5 through the chemical treating bath 1b.

Subsequently, the substrate B is subjected to the first water cleaning process through the first water cleaning bath 21 while being supplied with cleaning water from treating liquid supply means 6, and then subjected to the second water cleaning process through the second water cleaning bath 31 while being supplied with cleaning water from another treating liquid supply means 6 and de-ionized water from a de-ionized water supply nozzle 32 in the second water cleaning bath 31.

Finally, in the drying chamber 41, the surfaces of the substrate B are dried with gas (such as air) sprayed by an air knife 42. Thereafter, the substrate B is carried outside of the treating system 1 by the conveyor roller units 5 disposed immediately downstream of the drying chamber 41, and guided to a succeeding step through downstream transfer means (not shown) such as a robot.

In the baths 1b, 21, 31, and in the drying chamber 41, the conveyor roller units 5 are each disposed such that its axis is positioned in a plane perpendicular to the carrying direction of the substrate B and is inclined relative to the horizontal plane. The conveyor roller units 5 in the treating system 1 are all set to have the same inclination angle, and the tops of the conveyor roller units 5 jointly define a substrate pass line thereon along which the substrate B passes. This arrangement enables the substrate B to be subjected to certain treatment while it is carried in an inclined posture through the treating system 1.

In this embodiment, the inclination angle of the substrate B carried through the treating system 1 relative to the horizontal plane is set to the range of 3°–40°. The substrate B can be carried in a stable manner in the inclined posture within the above set range. The inclination angle of the substrate B may be desirably set within the above range, considering the kind of the treating liquid, the viscosity and supply amount of the treating liquid, the carrying speed of the substrate B etc., as far as the treating liquid can be replaced smoothly while preventing surface dry of the substrate B and assuring smooth removal of the liquid.

The inclination angle of the substrate B is determined considering various operating conditions such as the carrying speed of the substrate B, and the viscosity, pressure and supply amount of the treating liquid. However, in the case where a chemical of a small concentration and de-ionized water are employed as the treating liquid for example, the inclination angle may be set to the range of 3°–7°.

A substrate treating apparatus 10 of the substrate treating system 1 according to this invention is adapted to be part of the second water cleaning station 3 and the first water cleaning station 2 in this embodiment. Next, the first water cleaning station 2 (or the first water cleaning bath 21) as the substrate treating apparatus 10 is described with reference to FIGS. 2 to 4.

Figure 2:
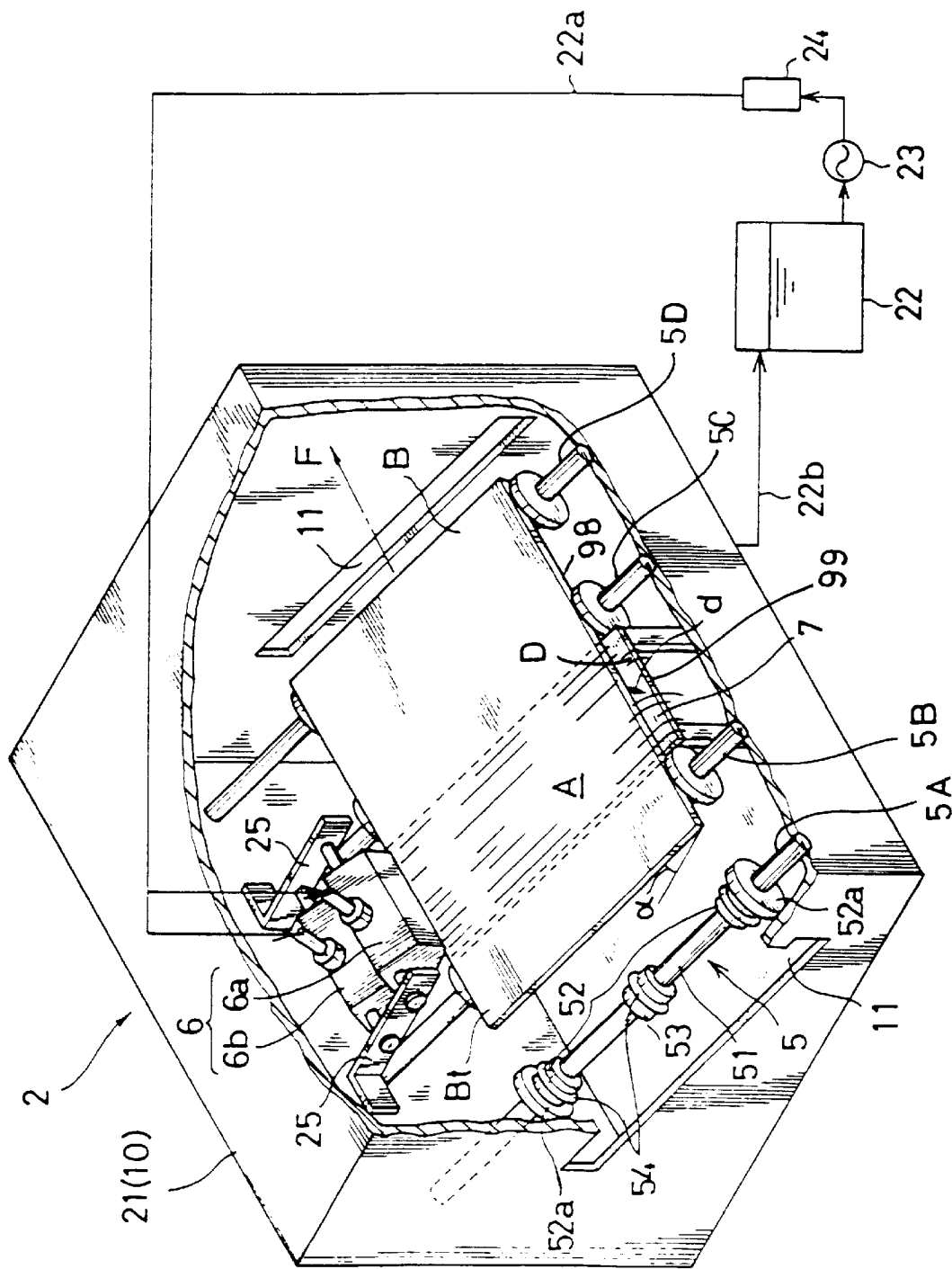
FIG. 2 is a perspective, partly cut away, of an embodiment of the substrate treating apparatus (first water cleaning bath) of the present invention.
Figure 3A:
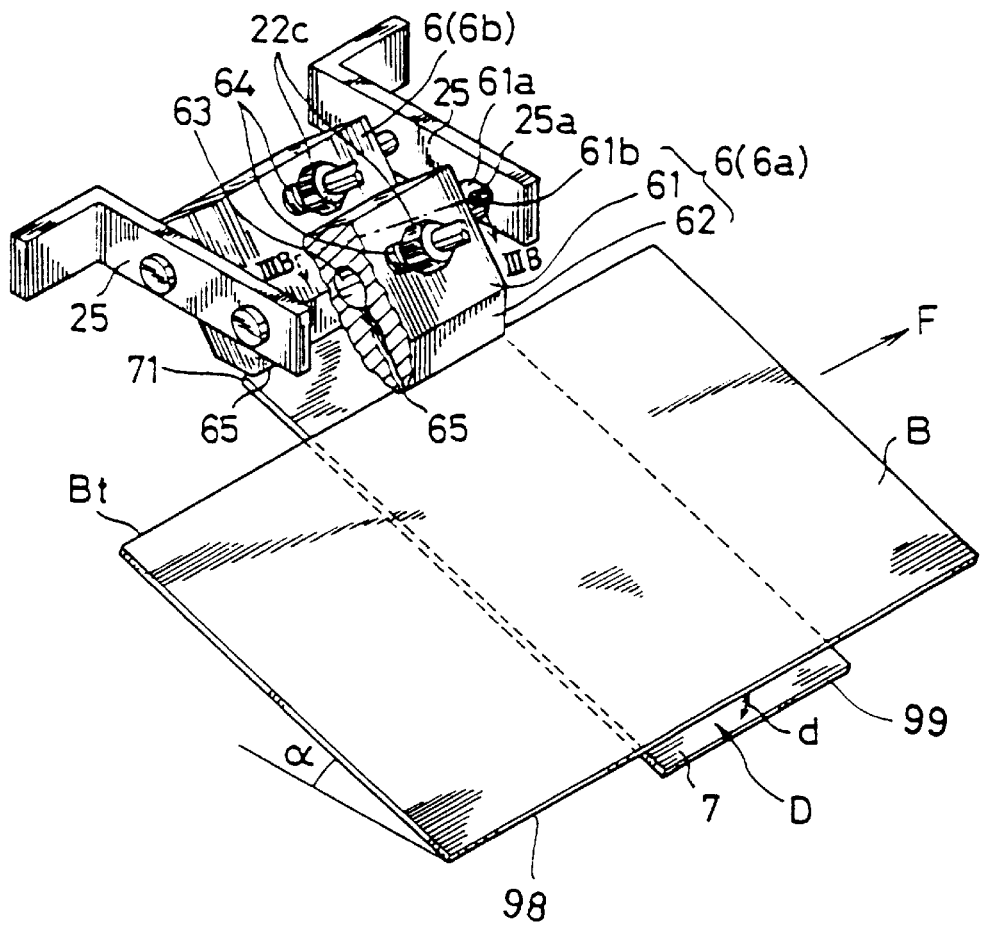
FIG. 3A is a perspective, partly cut away, of an embodiment of treating liquid supply means for use in the first water cleaning bath.
Figure 4:
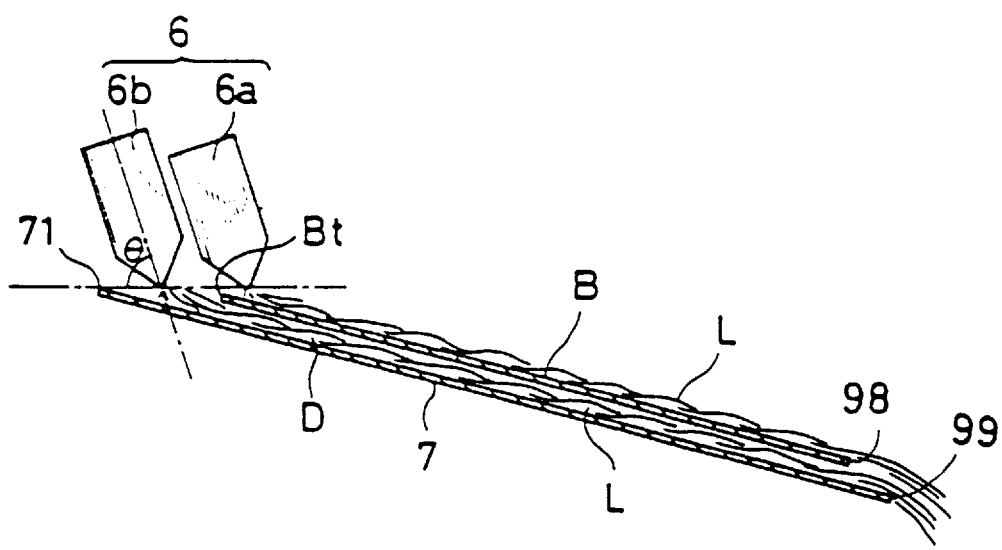
FIG. 4 is an explanatory side view showing streams of cleaning water being ejected from the treating liquid supply means and running down on the top and bottom surfaces of a substrate.

FIG. 2 is a perspective view, partly cutaway, showing an embodiment of the first water cleaning bath 21. FIG. 3A is a perspective view, partly cutaway, showing an embodiment of the treating liquid supply means 6. FIG. 4 is an explanatory side view showing streams of cleaning water L from the treating liquid supply means 6 running down along the top and bottom surfaces of a substrate B.

As shown in FIG. 2, in the first water cleaning bath 21, there are arranged four conveyor roller units 5 (in this case, 5A, 5B, 5C, and 5D in the order of substrate carrying direction (hereinafter simply referred to as F-direction shown by the arrow in FIG. 2), between the upstream and downstream openings 11, being spaced equidistantly from one another in the F-direction. These conveyor roller units 5 are provided at the same level (in height) and at the same inclination angle. With synchronous rotation of the conveyor roller units 5 in the carrying direction effected by driving the drive unit, a substrate B introduced into the first water cleaning bath 21 through the upstream opening 11 is carried toward the downstream opening 11 thereof.

The conveyor roller units 5 are of so-called partly supporting type. Each of the conveyor roller units 5 is constructed such that a roller support shaft 51 is rotatably mounted in an inclined posture extending through opposite inner side walls (front and rear side walls on the plane in FIG. 1) of the first water cleaning bath 21, a center roller 53 is provided at a center of the roller support shaft 51, and a pair of side rollers 52, 52 are provided at opposite axial ends of the roller support shaft 51 to be rotatable therewith. By employing the partly supporting conveyor roller units 5, the area in which the conveyor roller units 5 contact the bottom surface of the substrate B is greatly reduced as compared to the case of a cylindrical roller extending substantially over the lengthwise dimension of the roller support shaft, cleaning water can be easily supplied to the bottom surface of the substrate B, and contamination of the bottom surface of the substrate B due to contact with the conveyor roller units 5 during the cleaning process and the drying process can be minimized.

Each of the side rollers 52 includes a flange 52a disposed outside thereof in the axial direction of the roller support shaft 51. The substrate B is conveyed while being supported by the upper side roller 52, central roller 53, and lower side roller 52. The flange 52a of the lower side roller 52 is adapted to prevent the substrate B being carried in an inclined posture by the conveyor roller units 5 from sliding off therefrom.

Each of the rollers 52 and 53 is mounted with an O-ring 54 made of an elastic material such as rubber to prevent slip off of the substrate from the roller conveyor. With the operation of the O-rings 54 serving as slip-off stoppers, the substrate B can be assuredly carried over the roller conveyor in the carrying direction.

In the first water cleaning bath 21, there is mounted a pair of brackets 25, 25 on the rear side wall of the bath 21 and substantially in the middle in the F-direction. The brackets 25, 25 are opposed to each other in the F-direction at the same height level, and the treating liquid supply means 6 is mounted between the opposing brackets 25, 25.

The treating liquid supply means 6 includes a bottom surface treating liquid ejecting means (hereinafter merely referred to as a "rear ejector" as a first liquid supply member) 6b for ejecting cleaning water L toward the bottom surface of the substrate B and a top surface treating liquid ejecting means (hereinafter merely referred to as a "front ejector" as a second treating liquid supply member) 6a for ejecting cleaning water L toward the top surface of the substrate B.

In the first water cleaning bath 21, there is provided a guide plate 7 bridgingly mounted between the upstream side conveyor roller units 5A and 5B or between the intermediate conveyor roller units 5B and 5C. The guide plate 7 is mounted beneath the substrate pass line by a specified dimension d away from the substrate B passing along the substrate pass line in parallel with the axis of the support roller shafts 51. Thereby, there is provided a clearance D between the substrate B and the guide plate 7.

As shown in FIGS. 3A and 4, the guide plate 7 has a width W1 (dimension between side edges 71 and 99) that is larger than the width W (dimension between side edges Bt and 98); of the substrate B. Specifically, the width W1 of the guide plate 7 is set such that upper side edge 71 of the guide plate 7 protrudes outward from an upper side edge Bt of the substrate B by a specified amount, thereby forming an exposed area on the guide plate 7 exposing from the substrate B, while lower side edge 99 of the guide plate 7 is slightly protruded from a lower side edge of the substrate B.

The rear ejector 6b is set to eject a certain amount of cleaning water L so that upper streams of cleaning fluid are brought into contact with the bottom surface of the substrate B while flowing through the clearance D between the guide plate 7 and the substrate B so that the bottom surface of the substrate B is assuredly supplied with cleaning water.

As shown in FIG. 3A, the front ejector 6a has a slot-like cleaning water eject port 65 extending in the F-direction. The front ejector 6a is tilted downward with a certain inclination angle so that the cleaning water eject port 65 opposes the upper side edge Bt of the substrate B.

Likewise, the rear ejector 6b has a slot-like cleaning water eject port 65 extending in the F-direction. The rear ejector 6b is tilted downward with a certain inclination angle so that the cleaning water eject port 65 opposes the upper side edge 71 of the guide plate 7 and faces the exposed surface of the guide plate 7 protruding from the upper side edge Bt of the substrate B. With this arrangement, cleaning water L ejected from the front ejector 6a and rear ejector 6b is is prevented from spilling around the upper side edge Bt of the substrate B and around the upper side edge 71 of the guide plate 7, respectively.

As the substrate B introduced into the first cleaning water bath 21 (see FIG. 2) is conveyed in the F-direction by the conveyor roller units 5, streams of cleaning water ejected from the treating liquid supply means 6 run down across from one lateral side (upper side edge) to the opposite side (lower side edge) over the top and bottom surfaces of the substrate B. These streams of cleaning water ejected from the treating liquid supply means 6 are combined because of the guide plate 7 to form cleaning water supply area A for the top and bottom surfaces of a substrate being carried for cleaning operation.

In this embodiment, the dimension d of the clearance D is set to the range of 1 to 5 mm. By setting the dimension d of the clearance D within this range, the fluid rate and fluid amount necessary for performing desirable water cleaning process can be achieved optimally.

Specifically, in case of the dimension d less than 1 mm (narrow clearance D), cleaning water L is sealed within the clearance D between the substrate B and the guide plate 7, thereby reducing the fluid flow rate. This leads to an incomplete cleaning operation.

On the contrary, in case of the dimension d in excess of 5 mm (broad clearance D), an insufficient amount of cleaning water L supplied from the rear ejector 6b comes into contact with the bottom surface of the substrate B. The excessively broad clearance D unnecessarily increases the amount of cleaning water required to achieve the same cleaning result achieved in the case with the apparatus having adequate clearance. As can be imagined, increasing the clearance beyond a certain value makes it more difficult for the cleaning water to touch a bottom surface of the substrate being carried. Thus, there is an increase in the occurrence of the undesired phenomenon of incomplete cleaning of the bottom surface of the substrate.

There is provided a cleaning water tank 22 (see FIG. 2) near the first water cleaning bath 21 to store cleaning water L to be supplied to the treating liquid supply means 6. A cleaning water supply pipe line 22a is disposed between the cleaning water tank 22 and the treating liquid supply means 6. A cleaning water return pipe line 22b is disposed between a bottom of the first water cleaning bath 21 and an upper portion of the cleaning water tank 22. The cleaning water supply pipe line 22a and the cleaning water return pipe line 22b constitute a circulation pipe line along which cleaning water L is recirculated to be supplied to the substrate surfaces through the treating liquid supply means 6.

A cleaning water pump 23 is provided at a position along the cleaning water supply pipe line 22a immediately downstream of the cleaning water tank 22. A filter 24 is provided immediately downstream of the cleaning water pump 23. With activation of the cleaning water pump 23, cleaning water L in the tank 22 is first subjected to filtration through the filter 24 while passing through the cleaning water supply pipe line 22a.

Then, the cleaning water L is supplied to the front ejector 6a through which the water is ejected toward the top surface of the substrate B from the upper side edge Bt of the substrate B. At the same time, the cleaning water L is supplied to the rear ejector 6b through which the water is ejected onto the exposed surface of the guide plate 7 protruding out rearward of the upper side edge Bt and then is supplied to the bottom surface of the substrate B through the clearance D.

After being supplied to the top and bottom surfaces of the substrate B to perform a water cleaning process, the cleaning water L flows down into the first water cleaning bath 21 over the lowermost edge of the substrate B and the guide plate 7. Then, the cleaning water L collected in the first water cleaning bath 21 is returned to the cleaning water tank 22 through the cleaning water return pipe line 22b for repeated use by circulation.

A so-called high pressure pump to eject fluid at a high pressure level is employed as the cleaning water pump 23. With activation of the high pressure pump 23, cleaning water L at a high pressure level is ejected through the treating liquid supply means 6 onto the top and bottom surfaces of the substrate B. In this embodiment, the cleaning water pump 23 is designed to eject cleaning water L of a pressure level ranging from 2 to 10 $kgf/cm^2G$.

By setting the pressure level of cleaning water L within the above range, the following drawbacks are avoided. If the pressure level is less than 2 kgf/cm²G, i.e., the pressure at which cleaning water L is ejected from the treating liquid supply means 6 is too low, the fluid rate flowing on the top surface of the substrate B and in the clearance D between the substrate B and the guide plate 7 becomes also small, which results in a failure to clean the surfaces completely.

On the contrary, if the pressure level goes above 10 kgf/cm²G, it is required to design the cleaning water pump 23, cleaning water tank 22, and treating liquid supply means 6 to have such a durable construction as to withstand a high pressure flow of cleaning water L. Such special arrangement raises the facility cost, and is not desirable from the viewpoint of economics.

An actual pressure level of cleaning water L is set to a desirable value within the above range, considering various factors such as the size of the substrate B, the carrying speed of the substrate B, the viscosity of the cleaning water L, and the emission (supply) amount of the cleaning water L, so as to completely and uniformly cover the cleaning water supply area A for the top and bottom surfaces of the substrate B.

Cleaning water L from the treating liquid supply means 6 may be supplied continuously toward the guide plate 7 whether or not a substrate B is present, or may be supplied intermittently supplied, i.e., supplied only during passing of the substrate B. Continuous supply of cleaning water L enables keeping the guide plate clean. In the latter case of supplying cleaning water L intermittently, various measures may be adopted to timely supply cleaning water L to the substrate B. As one measure, a position sensor may be provided to detect the substrate B being carried toward the cleaning water supply area A (a proximity of treating liquid supply means 6), and supply of cleaning water L is controlled in accordance with a detection result of the sensor. As another measure, substrate carry control means (not shown) may control cleaning water L to be supplied at predetermined time intervals. The front ejector 6a (as well as rear ejector 6b) comprises a main body 61 in the form of elongated rectangular shape extending in the F-direction and a nozzle portion 65 provided at a lower end of the main body 61 and tapered as approaching toward a lead end thereof.

Figure 3B:
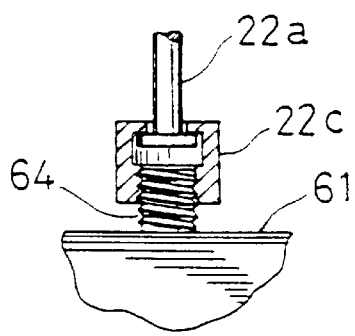
FIG. 3B is a fragmentary cross section taken along line IIIB and IIIB in FIG. 3A showing an internal arrangement of the joint portion between a connector tube and a cleaning water supply pipe.

The main body 61 is internally formed with a hole (cleaning water supply passage) 63 extending in the F-direction. The main body 61 further has a connector tube 64 having external screw threads. A joint member 22c is provided at a joint portion of the connector tube 64 to remain the downstream end of the cleaning water supply pipe line 22a as shown in FIGS. 3A and 3B. The upper end of the joint member 22c has a flange portion engaging with the lower end portion (larger diameter portion of the pipe line 22a) and the lower part of the joint member 22c is formed with an internal thread which is engageable with the outer threaded portion of the connector tube 64. Thus, by tightening the joint member 22c onto the connector tube 64, the lower end of the cleaning water supply pipe line 22a is pulled down onto the top end of the connector tube 64 to make contact with each other. Once the lower end of pipe line 22a is firmly pressed against the top end surface of the connector tube 64 by tightening joint member 22c at an adequate tightening torque, the pipe line 22a and the connector tube 64 are placed in tight engagement. With these parts firmly connected, the cleaning water supply means 6 having the front ejector 6a and the rear ejector 6b is connected with the cleaning supply pipe line 22a.

The nozzle portion 62 at the front of body 61 is formed with the cleaning water eject port 65 communicating with the cleaning water supply passage 63. The cleaning water eject port 65 is in the form of slot extending in the F-direction. Cleaning water L supplied to the cleaning water supply passage 63 of the front ejector 6a (and the rear ejector 6b) through the cleaning water supply pipe line 22a is supplied onto the top surface of the substrate B (and onto the exposed surface of the guide plate 7) through the eject port 65.

Figure 3C:
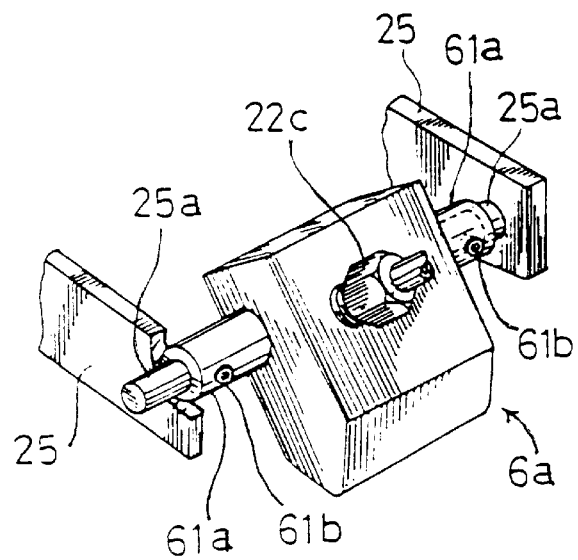
FIG. 3C is a perspective showing a structure for mounting a treating liquid supply means to a bracket of the substrate treating apparatus.

The treating liquid supply means 6 is mounted to the brackets 25, 25 in on a pair of aliged axially spaced cylindrical support rods 25a, 25a are integrally formed with the brackets 25, 25 as shown in FIG. 3C. On the other hand, the main body 61 of the front ejector 6a (rear ejector 6b) is integrally formed with a pair of outward sleeves 61a, 61a at opposite sides in the extending direction thereof. Each of the outward sleeves 61a, 61a has a length to receive a support rod 25a therein. By fittingly enclosing the right and left sides of the support rod 25a (25a) with the outward sleeves 61a, 61a (61a, 61a) of the front ejector 6a (rear ejector 6b), the treating liquid supply means 6 is rotatably supported by the brackets 25, 25 about the axis of the support rods 25a, 25a.

Each of the right and left outward sleeves 61a, 61a is externally mounted with a screw 61b which passes through the sleeves radially toward the axis of the support rod 25a (25a)to make contact with an outer surface of the support rod 25a. By tightening the screws 61b, 61b, the front ejector 6a (rear ejector 6b) of the treating liquid supply means 6 is fixedly secured to the brackets 25, 25 at a certain inclination angle with respect to the rotary axis of the support rods.

With this arrangement, when the screws 61b, 61b of the right and left outward sleeves 61a, 61a are loosened, the treating liquid supply means 6 is allowed to be freely rotatable about the axis of the support rod 25a (25a). By tightening the screws 61b, 61b when the treating liquid supply means 6 is at a desired inclination angle, the treating liquid supply means 6 is set at the desired inclination angle.

In FIG. 4, the inclination angle θ of the front ejector 6a (rear ejector 6b) relative to the horizontal plane is set to the range of 5° to 80°. If the inclination angle θ is less than 5 degree, cleaning water L ejected through the eject port 65 flows on the surfaces of the substrate with a less ejecting force and at a moderately low speed, so that removal of foreign matters adhered on the surfaces of the substrate is incomplete.

On the other hand, if the inclination angle θ exceeds 80 degree, the ejecting force of cleaning water applied on the top surface of the substrate B and exposed surface of the guide plate 7 becomes too large so that that water ejected to impinge on these surfaces my splash therefrom. Accordingly, when inclination angle θ is outside the range of 5° to 80° the substantial amount of cleaning water L ejected from the top and rear ejectors 6a and 6b cannot be supplied to uniformly cover the cleaning water supply area A for the top and bottom surfaces of the substrate B, resulting in excessive waste of cleaning water L.

The inclination angle θ may be set optimally in accordance with the inclination angle α of the substrate B relative to the horizontal plane. Note that the inclination angle α of the substrate B in this embodiment is set to about 30 degree.

As shown in FIG. 4, cleaning water L ejected from the front ejector 6a at a high pressure level is supplied to the top surface of the substrate B over the upper side edge Bt and runs at a high fluid rate over the cleaning water supply area A for the top surface down toward the lowermost side edge 98 of substrate B. In this way a cleaning process is preformed on the top surface of the substrate B.

At the same time, cleaning water L ejected from the rear ejector 6b at a high pressure level is first supplied to the exposed surface of the guide plate 7 protruding rearward of the upper side edge Bt of the substrate B, and then flows down through the clearance D between the guide plate 7 and the substrate B. As the cleaning water L flows down through the clearance D, streams of cleaning water L assuredly come into contact with the bottom surface of the substrate B owing to the existence of the guide plate 7, thereby subjecting the bottom surface of the substrate B to a cleaning process.

Since the guide plate 7 is provided beneath the substrate pass line, being spaced therefrom by the dimension d, it is clean that cleaning water L ejected from the rear ejector runs down the bottom surface of the substrate B. Accordingly, cleaning water L ejected from the rear ejector 6b is supplied to the entirety of the bottom surface of the substrate B for cleaning same.

Figure 5A:
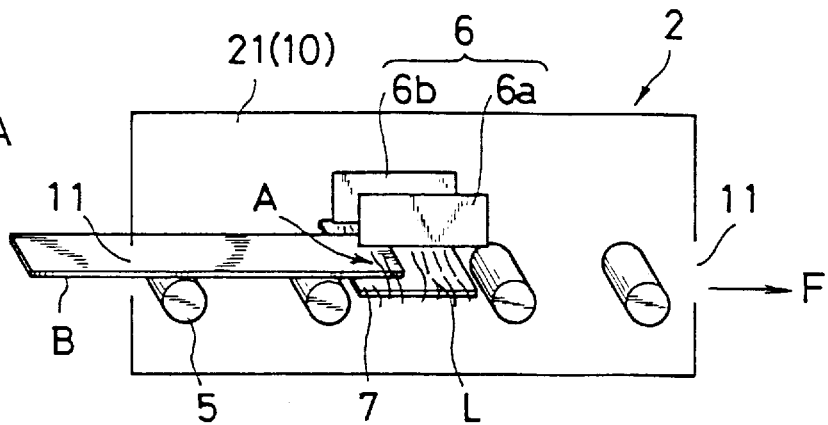
FIGS. 5A to 5C are explanatory views showing a cleaning operation as a substrate moves through the substrate treating apparatus of the present invention.
Figure 5B:
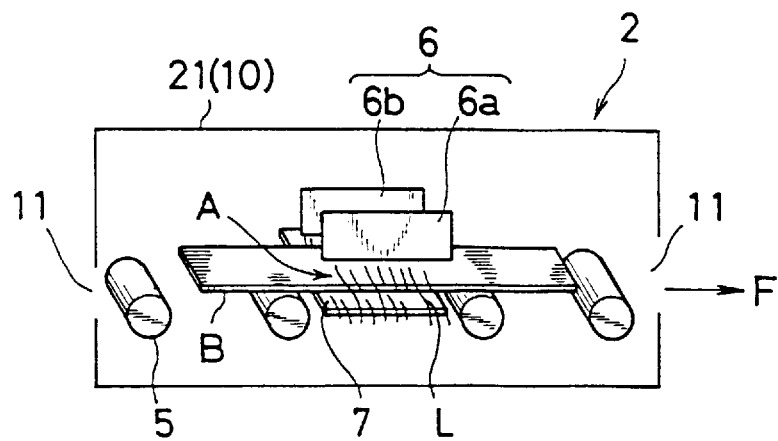
Figure 5C:
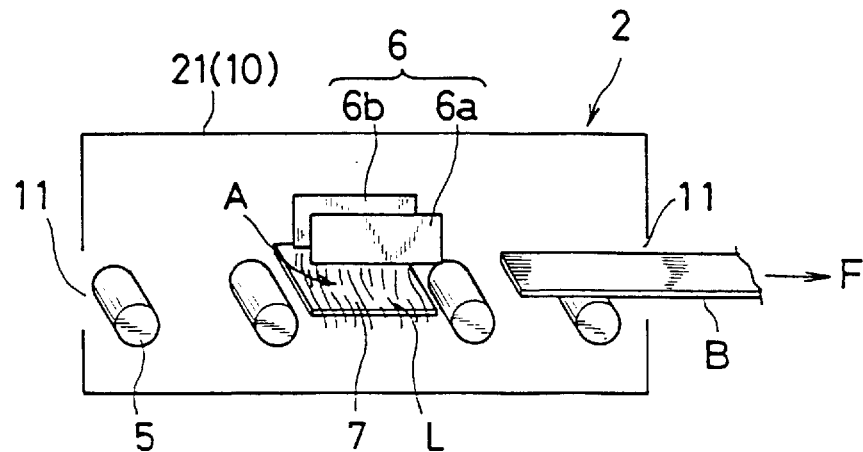

FIGS. 5A to 5C are explanatory views showing a cleaning operation in the substrate treating apparatus of the present invention with FIG. 5A showing the downstream end of the substrate B entering the cleaning water supply area A, with FIG. 5B showing an intermediate portion of the substrate B at the cleaning water supply area A and with FIG. 5C showing the substrate B leaving the cleaning water supply area A.

As shown in FIG. 5A, with an activation of the conveyor roller units 5, a substrate B is introduced into the first water cleaning bath 21 through the upstream (left side) opening 11 and conveyed toward the cleaning water supply area A. As the substrate B is conveyed toward the cleaning water supply area A, with an activation of the cleaning water pump 23 (see FIGS. 1 and 2), cleaning water L in the water tank 22 is supplied to the treating liquid supply means 6 via the cleaning water supply pipe line 22a. The cleaning water L being supplied is ejected through the respective eject ports 65 of the top and rear ejectors 6a and 6b of the treating liquid supply means 6 and runs across the substrate B in the widthwise direction over the top and bottom surfaces thereof.

In particular, cleaning water L ejected from the rear ejector 6b flows down through the clearance D while being guided by the guide plate 7 to assure that this water L comes into contact with the bottom surface of the substrate B, thereby performing a cleaning process on the bottom surface of substrate B at the lead portion of the substrate B. At the same time water from front ejector 6a subjects the lead portion of the top surface of substrate B to a cleaning process.

Subsequently, as shown in FIG. 5B, when the intermediate portion of the substrate B enters the cleaning water supply area A by the driving of substrate B by the conveyor roller units 5, cleaning water L ejected from the treating liquid supply means 6 is supplied to the intermediate portion of the substrate B, thereby performing a cleaning process on the intermediate portion of the top and bottom surfaces of the substrate B.

Cleaning water L is supplied from the treating liquid supply means 6 to the cleaning water supply area A at a high pressure. Accordingly, the cleaning water L runs down across the top and bottom surfaces of the substrate B at a high fluid rate, with the result that only a meager amount of cleaning water L in a very thin film-like state remains on the top and bottom surfaces of the substrate B which has passed the cleaning water supply area A.

As shown in FIG. 5C, when the substrate comes completely out of the cleaning water supply area A by using conveyor roller units 5 to drive subsrate B, cleaning processes on the entire top and bottom surfaces of the substrate B by the cleaning water L are completed, and the cleaning water L is removed from the top and bottom surfaces of the substrate with only a meager amount of cleaning water L remaining in a very thin film-like state thereon.

Accordingly, an amount of cleaning water L which is assumed to be enter second water cleaning station 3 (see FIG. 1) where a next step is to be performed can be reduced as much as possible. Further, generation of particles resulting from partial dry on the top and bottom surfaces of the substrate B, is suppressed since the cleaning water L runs uniformly runs over the surfaces of the substrate B at a high fluid rate, in it turn leaves a very thin film-like layer of cleaning water remaining on the top and bottom surfaces of the substrate.

As shown in FIG. 5C, the substrate treating apparatus 10 in this embodiment is constructed such that cleaning water L ejected from the treating liquid supply means 6 flows continuously to form the cleaning water supply area A irrespective of the presence or absence of the substrate B at the cleaning water supply area A. With this construction, the surface of the guide plate 7 can be kept clean, and the possibility of contamination can be eliminated.

Figure 6:
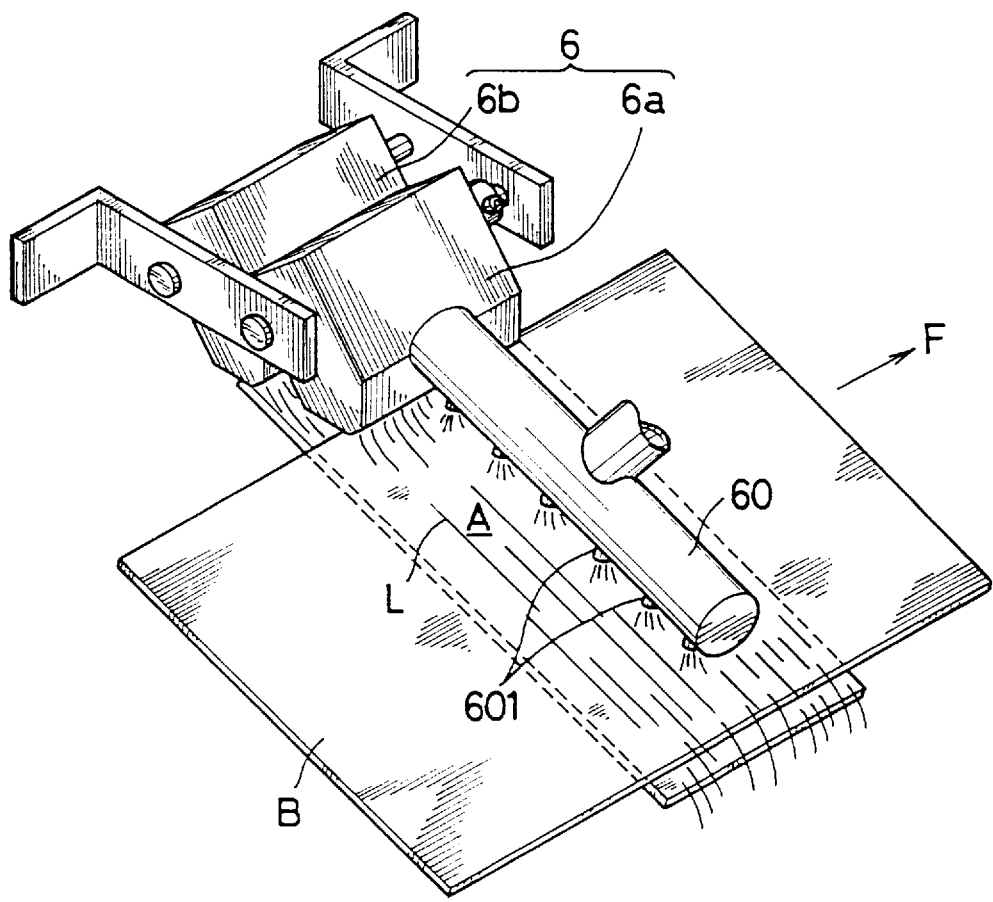
FIG. 6 is a perspective of an altered form of the substrate treating apparatus of FIG. 3A in which a sprinkler pipe is additionally provided to a front ejector of treating liquid supply means.

FIG. 6 is a perspective showing an altered form of the substrate treating apparatus. The construction of the altered form is basically identical to that of the above embodiment in that the first water cleaning bath 21 is adapted as the substrate treating apparatus. In the altered form, however, a front ejector 6a is additionally provided with a sprinkler pipe 60 that extends substantially half the width W of the substrate B in parallel therewith and above the cleaning water supply area A. The sprinkler pipe 60 has an array of shower nozzles 601 at a bottom portion thereof spaced away by a certain distance from one another. The shower nozzles 601 are aligned in the lengthwise direction of the sprinkler pipe 60. A spray type nozzle such as cone-shape nozzle or fan-shape nozzle may be employed as the shower nozzle 601.

Part of the cleaning water L supplied from the front ejector 6a is introduced to the sprinkler pipe 60, which in turn supplies water L toward the cleaning water supply area A through the shower nozzles 601.

With the above construction is which sprinkler pipe 60 is additionally provided for the treating liquid supply means 6, part of cleaning water L is supplied to the top surface of the substrate B through the nozzles 601 of the sprinkler pipe 60 as cleaning water L1, in addition to the supply of cleaning water L from the top and rear ejectors 6a and 6b of the treating liquid supply means 6. More particularly streams of cleaning water L running on the top surface of the substrate B in the widthwise direction thereof are disturbed with cleaning water L1 supplied from the sprinkler pipe 60. Is this way the streams of cleaning water L are mixed with the cleaning water L1 in an adequate manner, and contact of the streams of cleaning water on the principal plane of the substrate B is made uniform.

Further, the cleaning water L1 supplied from the sprinkler pipe 60 with the streams of cleaning water L flowing down on the principal plane of the substrate B, and the impact of water due to the collision is applied to the principal plane, which facilitates removal of particles adhered to the principal plane of the substrate B and improves the cleaning ability of the substrate treating apparatus.

This invention is not limited to the above embodiment and is applicable to the following modifications.

(1) In the above embodiment, the top and rear ejectors 6a and 6b are provided to eject cleaning water L of a high pressure onto the top and bottom surfaces of a substrate B. Alternatively, cleaning water L of a pressure, e.g, less than 2 kgf/cm²G may be supplied from the top and rear ejectors 6a and 6b and through shower nozzles such as cone-shape and fan-shape nozzles onto the top and bottom surfaces of the substrate B.

In this case, liquid removal means such as an air knife of a certain length extending in the widthwise direction of the substrate B may be provided downstream of the treating liquid supply means 6 to remove the treating liquid from the top surface of the substrate B.

(2) In the above embodiment, the substrate treating apparatus 10 is applied to the first water cleaning bath 21. However, the substrate treating apparatus of this invention is also applicable to the second water cleaning bath 31. In this case, however, it may be preferable to have the arrangement of the treating liquid supply means in the above embodiment employed only for the first half cleaning process in the second water cleaning station 3 which is to be conducted immediately after the cleaning process in the first water cleaning station 2. In other words, it may be preferable to have a water source for the treating liquid supply means for use in the first half cleaning process provided independently of a water source for use in the latter half cleaning process following the first half cleaning process.

(3) In the foregoing embodiment, the cleaning water L is used as the treating liquid for cleaning the top and bottom surfaces of the substrate B. Alternatively, the treating liquid may be a developer, etchant for etching a thin metallic film formed on the surface of the substrate B, remover for removing a photoresist film coated on the surface of the substrate after etching, substituent such as isopropylalcohol for substituting the remover, and de-ionized water for washing off the remover.

Figure 7:
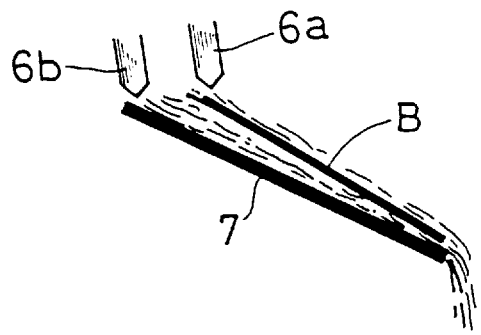
FIG. 7 is an explanatory side view showing another embodiment of this invention.

(4) In the foregoing embodiment, the guide plate 7 is provided in parallel with the substrate B. In place of the parallel arrangement, as shown in FIG.7 the guide plate 7 may be arranged in non-parallel with respect to the substrate B. For example, the guide plate 7 may be arranged such that the clearance between the guide plate 7 and the substrate B is gradually decreased from the upper side toward the lower side of the guide plate 7.

With this non-parallel arrangement, there can be avoided the phenomenon that the thickness of streams of cleaning water L on the guide plate 7 is reduced as running down toward the lower side of the guide plate 7 due to spread of the streams in the F-direction, hence resulting in a non-uniform cleaning. There can be secured uniform contact of cleaning water L with the bottom surface of the substrate B over the entirety of the cleaning water supply area A including the lower side.

(5) Further, in the above embodiment, the upper side edge of the guide plate 7 is protruded rearward from the upper side edge of the substrate B and the upper side edge of the guide plate 7 is higher than that of the upper side edge of the substrate B to form the exposed area of the guide plate 7, and cleaning water L from the rear ejector 6b is first supplied to the exposed area of the guide plate 7 and then to the bottom surface of the substrate B.

Figure 8:
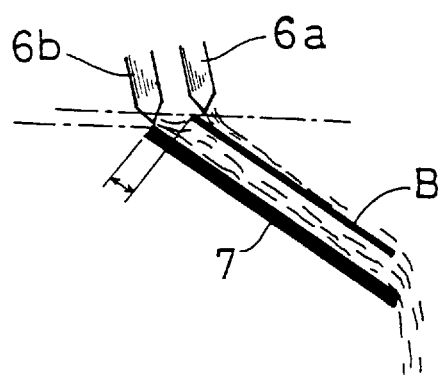
FIG. 8 is an explanatory side view showing still another embodiment of this invention.

Alternatively, as shown in FIG. 8, the upper side edge of the guide plate 7 may protrude from the upper edge of the substrate B in a view tangential to the principal surface of the substrate by an amount such that the height of the upper edge of the substrate B is still above the height of the upper edge of the guide plate 7.

Figure 9:
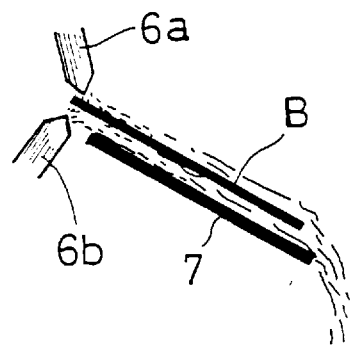
FIG. 9 is an explanatory side view showing yet another embodiment of this invention.

Furthermore, the upper side edge of the guide plate 7 may coincide with the upper side edge of the substrate B, or may be inwardly disposed from the upper side edge of the substrate B as shown in FIG. 9. In the latter case (shown in FIG. 9), the rear ejector 6b may be provided below the substrate pass line such that the eject port 65 of the rear ejector 6b is oriented upward with a certain inclination angle toward the upper side edge on the bottom surface of the substrate B to supply cleaning water L directly to the bottom surface of the substrate B through the eject port 65 of the rear ejector 6b.

With this arrangement, cleaning water L supplied from the rear ejector 6b is first ejected on the upper side (edge) of the bottom surface of the substrate B and flows down along the bottom surface of the substrate B with substantially the same ejecting force applied to the upper side (edge) of the bottom surface of the substrate B. As the cleaning water L runs down across the substrate B, the guide plate 7 restricts falling down of the cleaning water L from the bottom surface (non-contact of cleaning water L with the bottom surface), so that a cleaning process is performed on the bottom surface of the substrate B.

This arrangement shown in FIG. 9 is advantageous in the following aspect. The front ejector 6a and the rear ejector 6b are arranged vertically opposed to each other with the respective eject ports 65, 65 inclined downward and upward toward the cleaning water supply area A with the substrate pass line interposed therebetween. Compared to the case in which both the top and rear ejectors 6a and 6b are provided above the substrate pass line in an aligned state, this arrangement enables effective use of the interior space of the first water cleaning bath 21, thereby reducing the size of the first water cleaning bath 21.

Although the present invention has been fully described by way of examples with reference to the accompanied drawings, it is to be understood that various changes and modifications will be apparent to those skilled in the art without departing from the spirit and the scope of the invention. Accordingly, the invention should not be limited by the foregoing description but rather should be defined only by the following claims.

What is claimed is:

1. A substrate treating apparatus in which a treatment is performed to a top surface and a bottom surface of a substrate to be carried on a substrate carrying plane inclined at a certain angle to a horizontal plane in a direction normal to a substrate carrying direction, the substrate treating apparatus comprises:

a guide plate provided below the substrate carrying plane along which a bottom surface of the substrate is to be carried; and treating liquid supply means including a first treating liquid supply member for supplying a treating liquid to a clearance defined between the bottom surface of the substrate carrying plane and the guide plate.

2. A substrate treating apparatus according to claim 1, wherein a size of the guide plate in a direction normal to the substrate carrying direction is set larger than the substrate being carried on the substrate carrying plane.

3. A substrate treating apparatus according to claim 1, wherein an upper end of the guide plate is set higher in altitude than the upper edge of the substrate being carried along the substrate carrying plane.

4. A substrate treating apparatus according to claim 3, wherein the first treating liquid supply member is so set that the treating liquid is sprayed from an upper side of the guide plate.

5. A substrate treating apparatus according to claim 3, wherein the first treating liquid supply member has an ejection port extending in the substrate carrying direction.

6. A substrate treating apparatus according to claim 1, wherein an upper end of the guide plate is positioned such that the upper end thereof projects from the upper edge of the substrate being carried along the substrate carrying plane from a view normal to the substrate carrying plane.

7. A substrate treating apparatus according to claim 6, wherein the first treating liquid supply member is so set that the treating liquid is sprayed from an upper side of the guide plate.

8. A substrate treating apparatus according to claim 6, wherein the first treating liquid supply member has an ejection port extending in the substrate carrying direction.

9. A substrate treating apparatus according to claim 1, wherein an upper end of the guide plate is positioned such that the upper edge of the substrate being carried projects from the upper end of the guide plate from a view normal to the substrate carrying plane.

10. A substrate treating apparatus according to claim 9, wherein the first treating liquid supply member is so set that the treating liquid is sprayed from a lower side of the guide plate.

11. A substrate treating apparatus according to claim 9, wherein the first treating liquid supply member has an ejection port extending in the substrate carrying direction.

12. A substrate treating apparatus according to claim 1, wherein the clearance between the upper surface of the guide plate and the substrate carrying plane is set in the range of 1 to 5 mm.

13. A substrate treating apparatus according to claim 12, wherein the guide plate is in parallel to the substrate carrying plane.

14. A substrate treating apparatus according to claim 12, wherein the guide plate is so oriented that the clearance between the guide plate and the substrate carrying plane decreases as it departs from the treating liquid supply means in the direction normal to the substrate carrying direction.

15. A substrate treating apparatus according to claim 1, the liquid supply means includes a second treating liquid supply member for supplying the treating liquid onto the upper surface of the substrate being carried on the substrate carrying plane.

16. A substrate treating apparatus according to claim 15, wherein the treating liquid supply means includes a third treating liquid supply member extending across a lateral direction of the substrate carrying plane.

17. A substrate treating apparatus according to claim 16, wherein the second treating liquid supply member is set normal to longitudinal direction of the third treating liquid supply member.

18. A substrate treating apparatus according to claim 1, a pressure to supply the treating liquid of the first treating liquid supply member onto the bottom surface of the substrate is set in the range of 2–10 $kgf/cm^2$.

19. A substrate treating apparatus according to claim 1, wherein the specified angle of the inclined posture of the, substrate carrying plane is set in a range of 3–40 degree from a horizontal plane.

* * * * *